Oct. 10, 1967 S. C. KITSOPOULOS 3,346,697

TIME DIVISION HYBRID WITH BILATERAL GAIN

Filed Dec. 28, 1965

INVENTOR
S. C. KITSOPOULOS
BY R. B. Ardis
ATTORNEY

United States Patent Office 3,346,697

Patented Oct. 10, 1967

3,346,697

TIME DIVISION HYBRID WITH BILATERAL GAIN

Sotirios C. Kitsopoulos, Summit, N.J., assignor to Bell Telephone Laboratories, Incorporated, New York, N.Y., a corporation of New York Filed Dec. 28, 1965, Ser. No. 517,002
11 Claims. (Cl. 179—15)

Figure 1:
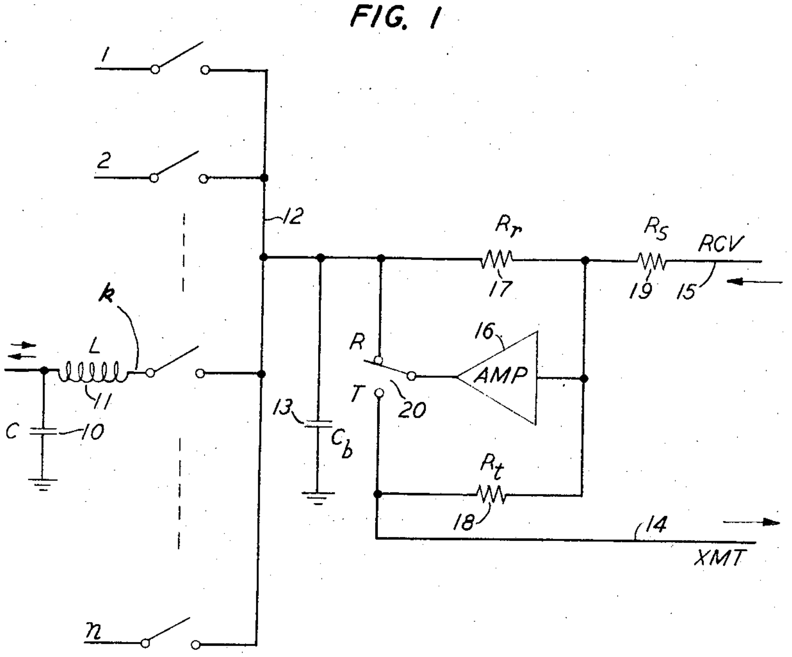

This invention relates generally to time division communication systems and more particularly to time division communication systems which employ time division hybrids at the interfaces between two-wire and four-wire transmission circuits.

United States Patent 2,936,338, which issued May 10, 1960, to D. B. James and J. D. Johannesen, discloses a system employing a time division hybrid to couple a plurality of two-wire voice frequency transmission circuits to a single four-wire pulse modulation transmission circuit. In that system, each two-wire circuit or bilateral channel contains an individual time division sampling switch or gate connecting it to a common bus, the unilateral transmitting channel of the four-wire circuit contains a common time division transmitting switch or gate connecting it to the common bus, and the unilateral receiving channel of the four-wire circuit contains a common time division receiving switch or gate connecting it to the common bus. In operation, the several sampling switches are closed in sequence and, while each sampling switch is closed, the common transmitting and receiving switches are closed in alternation. A separate clamp is provided to dissipate the energy stored on the common bus during each guard space intervening between the closing of successive sampling switches in order to avoid interchannel crosstalk. If bilateral gain is required in the time division hybrid, separate amplifiers may be employed in the respective transmitting and receiving channels of the four-wire circuit.

One object of the invention is to introduce bilateral gain into a time division hybrid of this type without using more than a single unilateral amplifier.

Another and more particular object is to introduce bilateral gain which is independently adjustable in each direction in a time division hybrid without using more than a single unilateral amplifier.

Still another object of the invention is to suppress interchannel crosstalk in a time division hybrid of this type without using a separate clamping circuit.

In accordance with the invention, these and other objects are attained in a time division hybrid of the type disclosed in the James-Johannesen patent with the aid of a single shunt-shunt negative feedback amplifier connected in the four-wire transmission circuit and the electronic equivalent of a single pole double throw switch connected in the feedback loop of the amplifier to switch feedbacks and thereby switch its direction of gain. This single switch replaces the separate time division transmitting and receiving switches in the four-wire portion of the time division hybrid disclosed by James and Johannesen. Furthermore, the use of feedback around this single switch improves its performance in the manner explained in copending application Ser. No. 421,863, which was filed Dec. 29, 1964, by the present inventor and J. S. Mayo.

In at least one embodiment of the invention, a first feedback resistance is connected between the amplifier input and the common bus in the bilateral portion of the hybrid, a second feedback resistance is connected between the amplifier input and the transmitting channel in the four-wire circuit, a third resistance is connected between the amplifier input and the receiving channel in the four-wire circuit, and the single common time division switch connects the amplifier output to the common bus and the transmitting channel in alternation. In the receiving portion of the switching cycle incoming signals from the receiving channel traverse the tandem transmission path formed by the third resistance and the feedback amplifier with the first resistance constituting a feedback path.

The receiving gain is thus determined by the ratio of the first resistance to the third. In the transmitting portion of the switching cycle, on the other hand, signals from the common bus traverse the tandem transmission path formed by the first resistance and the feedback amplifier; with the second resistance constituting the feedback path. The transmitting gain is thus determined by the ratio of the second resistance to the first. The gain in one direction of transmission is thus independent of the gain in the opposite direction and independent adjustments can be made.

Because the output impedance of the shunt-shunt negative feedback amplifier featured by the invention is extremely low, no separate clamping circuit is needed for dissipating energy stored on the common bus during the guard spaces intervening between the closing of successive individual sampling switches. During the receiving portion of the common switching cycle the output impedance of the common amplifier provides a low impedance to ground from the common bus. The separate clamp required by the James-Johannesen circuit may thus be dispensed with.

Figure 2:
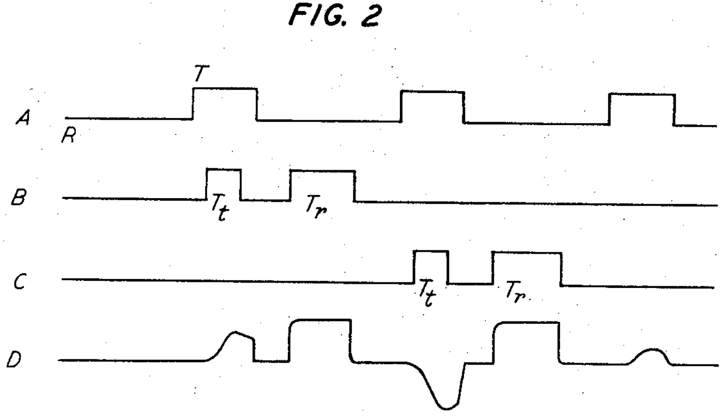

A more complete understanding of the invention may be obtained from a study of the following detailed description of the structure and mode of operation of a specific embodiment. In the drawing:

FIG. 1 is a block diagram of a time division hybrid providing bilateral gain in accordance with the principles of the invention, and FIG. 2 shows a number of wave forms appearing at various points in the embodiment of the invention illustrated in FIG. 1.

In the embodiment of the invention illustrated in FIG. 1, a plurality of two-wire circuits 1 through *n* are sampled sequentially by respective time division sampling switches after band limiting by low-pass filters. Although only the output shunt capacitor 10 of the low-pass filter in an intermediate two-wire circuit *k* is shown, it is to be understood that similar filters are employed in each of the other two-wire circuits. In addition, a series inductor 11 is employed to aid, in a manner which will be described, in resonant transfer. The two-wire circuits may, for example, be voice frequency subscriber telephone lines, in which case the low-pass filters are designed to have cut-off frequencies of the order of 4 kilocycles. The sampling switches, although shown simply as single-pole single-throw switches, are high speed diode or transistor transmission gates which are enabled and disabled in sequence at the prescribed sampling rate. As shown, the sampling switches connect the respective two-wire circuits to a common bus 12, the capacitance to ground of which is built out to a controlled value by a capacitor 13.

Common bus 12, which serves as a bilateral link to two-wire circuits 1 through *n*, is connected to the four-wire circuit composed of transmitting line 14 and receiving line 15 by a time division hydrid composed of an amplifier 16, three resistors 17, 18, and 19, and a time division switch 20. Amplifier 16 is an operational type amplifier with one net phase reversal between its input and its output and is provided with a shunt-shunt (i.e., connected in shunt to the amplifier transmission path at both input and output) negative feedback path by either resistor 17 or resistor 18. Time division switch 20, which is the electronic equivalent of a single-pole double-throw switch, is connected in the feedback loop of the amplifier and makes either resistor 17 or resistor 18 the effective feedback path. In practice, switch 20 may take the form of a pair of high speed diode or transmission gates which are enabled and disabled in alternation.

As illustrated in FIG. 1, feedback resistor 17 is connected between common bus 12 and the input of amplifier 16, feedback resistor 18 is connected between transmitting line 14 and the input of amplifier 16, and resistor 19 is connected between receiving line 15 and the input of amplifier 16. Time division switch 20 connects the output of amplifier 16 to common bus 12 and transmitting line 14 in alternation. In this manner, a through receiving path is formed when switch 20 is in its upper or receiving position by receiving line 15, series resistor 19, the shunt-shunt negative feedback amplifier formed by amplifier 16 and feedback resistor 17, and common bus 12. When switch 20 is in its lower or transmitting position, a through transmitting path is formed by common bus 12, series resistor 17, the shunt-shunt negative feedback amplifier formed by amplifier 16 and feedback resistor 18, and transmitting line 14.

A timing diagram illustrating the operation of the embodiment of the invention shown in FIG. 1 appears in FIG. 2. In FIG. 2, line A illustrates the operation of the time division transmit-receive switch 20, R representing the upper or receive position and T representing the lower or transmit position of switch 20 in FIG. 1. Lines B and C of FIG. 2 illustrate the operation of the sampling switches connecting the respective $k$ and $k+1$ two-wire circuits in FIG. 1 to common bus 12. Finally, line D of FIG. 2 illustrates the voltages across common bus capacitor 13 in FIG. 1 as a function of time.

As shown in lines A and B of FIG. 2, at the beginning of a transmit cycle in the embodiment of the invention illustrated in FIG. 1, time division switch 20 closes its transmit contact first. One of the sampling switches, e.g., the one in two-wire circuit $k$, then closes and the charge on shunt capacitor 10 is transferred resonantly through series inductor 11 onto common bus capacitor 13. Amplifier 16 is connected so that resistor 17 acts as an input resistor and resistor 18 acts as a negative feedback resistor. The voltage across common bus capacitor 13 illustrated in line D of FIG. 2 then appears on transmitting line 14, amplified by the factor $$G_t=-\frac{R_t}{R_r} \tag{1}$$

where $G_t$ is the transmitting gain of the shunt-shunt feedback amplifier, $R_t$ is the resistance of resistor 18, and $R_r$ is the resistance of the resistor 17.

Receiving line 15 is connected to transmitting line 14 during this time but, because the system is a time division system, there is no incoming signal on receiving line 15 to leak through. The time the sampling switch remains closed is equal to one-half the natural period of oscillation of the series combination of capacitors 10 and 13 with inductor 11 in order to satisfy the resonant transfer condition. Thus, $$T_t=\pi\sqrt{L\frac{CC_b}{C+C_b}} \tag{2}$$

where $T_t$ is the duration of the closure of the sampling switch, L is the inductance of inductor 11, C is the capacitance of capacitor 10, and $C_b$ is the capacitance of common bus capacitor 13. Resonant transfer is not a prerequisite to the operation of the circuit, of course, but does aid in providing efficient operation.

Finally, the sampling switch opens and time division switch 20 transfers to its receive contact to terminate the transmitting cycle. Before the receiving cycle starts with the closing of the same sampling switch, i.e., the sampling switch in two-wire circuit $k$, any charge left on common bus capacitor 13 is, in accordance with an important feature of the invention, very quickly dissipated into the extremely low output impedance of the shunt-shunt negative feedback amplifier. Resistor 17 then serves as the feedback element and resistors 19 serves as an input resistor.

While switch 20 is on its receiving contact, any signal appearing on transmitting line 14 would be transmitted back to common bus 12, attenuated by the inverse of $G_t$. No such signal can appear, however, because of the unidirectional nature of transmitting line 14. Even if transmitting line 14 and receiving line 15 were not unidirectional, moreover, transmission from transmitting line 14 to receiving line 15 would be impossible at any time because of the unidirectionality of amplifier 16 and because its input is a virtual ground.

During the receive closure of any sampling switch, e.g., the one in two-wire circuit $k$, the voltage appearing on receiving line 15 is amplified by $$G_r=-\frac{R_r}{R_s} \tag{3}$$

wherein $G_r$ is the receiving gain of the shunt-shunt feedback amplifier, $R_r$ is the resistance of resistor 17, and $R_s$ is the resistance of resistor 19. The output of the feedback amplifier is an ideal voltage source and charges capacitor 10 by resonant transfer through inductor 11. The resonant transfer condition is now $$T_r=\pi\sqrt{LC} \tag{4}$$

where $T_r$ is the duration of closure of the sampling switch during the received cycle, L is the inductance of ductor 11, and C is the capacitance of capacitor 10. As shown in line B of FIG. 2, $T_r$ is greater than $T_t$ in duration. As noted above, however, resonant transfer is not a prerequisite to the operation of the circuit but does help assure the efficiency of operation.

During the guard interval between the opening of the sampling switch in two-wire circuit $k$ and the closing of the sampling switch in two-wire circuit $k+1$, the low output impedance of the feedback amplifier is, in accordance with a feature of the invention, used to clamp common bus capacitor 13 to ground. Crosstalk between the time slots of adjacent two-wire circuits is thereby drastically reduced without any need for employing a separate clamping circuit.

It is to be understood that the above described arrangement is illustrative of the application of the principles of the invention. Numerous other arrangements may be devised by those skilled in the art without departing from the spirit and scope of the invention.

What is claimed is:

1. In a time division communication system which includes at least one bilateral channel and a pair of unilateral channels for transmission in opposite directions, a gain-producing link between said bilateral channel and said unilateral channels which comprises a unilateral amplifier having an input terminal and an output terminal, a first negative feedback impedance for said amplifier connected between said input terminal and said bilateral channel, a second negative feedback impedance for said amplifier connected between said input terminal and a first of said unilateral channels, a third impedance connected between said input terminal and the second of said unilateral channels, and a time division switch interconnecting said output terminal with said bilateral channel and said first unilateral channel.

2. A time division communication system in accordance with claim 1 in which said first unilateral channel is a transmitting channel and said second unilateral channel is a receiving channel.

3. A time division communication system in accordance with claim 2 in which said time division switch connects said output terminal with said bilateral channel and said transmitting channel in alternation.

4. A time division communication system in accordance with claim 3, in which said first impedance forms a shunt-shunt negative feedback for said amplifier when said time division switch connects said output terminal to said bilateral channel and said second impedance forms a shunt-shunt negative feedback path for said amplifier when said time division switch connects said output terminal to said transmitting channel.

5. A time division communication system in accordance with claim 4 in which said first, second, and third impedances are all resistances.

6. A time division communication system, which includes a plurality of individual bilateral channels, a common bilateral channel, individual time division switches connecting respective ones of said individual bilateral channels to said common bilateral channel, a pair of unilateral channels for transmission in opposite directions, and a gain-producing link between said common bilateral channel and said unilateral channels which comprises a unilateral amplifier having an input terminal and an output terminal, a first negative feedback impedance for said amplifier connected between said input terminal and said common bilateral channel, a second negative feedback impedance for said amplifier connected between said input terminal and a first of said unilateral channels, a third impedance connected between said input terminal and the second of said unilateral channels, and a common time division switch interconnecting said output terminal with said common bilateral channel and said first unilateral channel.

7. A time division communication system in accordance with claim 6 in which said first unilateral channel is a transmitting channel and said second unilateral channel is a receiving channel.

8. A time division communication system in accordance with claim 7 in which said common time division switch connects said output terminal with said common bilateral channel and said transmitting channel in alternation and said individual time division switches enable each of said individual bilateral channels in sequence, a different one of said individual bilateral channels being enabled during each successive cycle of said common time division switch.

9. A time division communication system in accordance with claim 8 in which a storage capacitor is connected across said common bilateral channel.

10. A time division communication system in accordance with claim 9 in which said first impedance forms a shunt-shunt negative feedback path for said amplifier when said common time division switch connects said output terminal to said common bilateral channel and said second impedance forms a shunt-shunt negative feedback path for said amplifier when said common time division switch connects said output terminal to said transmitting channel.

11. A time division communication system in accordance with claim 10 in which said first, second, and third impedances are all resistances.

References Cited

UNITED STATES PATENTS

| | | | |
|---|---|---|---|
| 2,757,283 | 7/1956 | Ingerson et al. ______ | 179—15 X |
| 2,927,967 | 3/1960 | Edson ______________ | 179—15 |
| 3,134,856 | 5/1964 | Jorgensen ___________ | 179—15 |

JOHN W. CALDWELL, *Acting Primary Examiner.*

ROBERT L. GRIFFIN, *Examiner.*